(12) United States Patent  
Cheng et al.

(10) Patent No.: US 7,698,587 B2  
(45) Date of Patent: Apr. 13, 2010

(54) PORTABLE ELECTRONIC APPARATUS WITH A POWER SAVING FUNCTION AND METHOD FOR IMPLEMENTING THE POWER SAVING FUNCTION

(75) Inventors: Hua-Dong Cheng, Guangdong (CN); Wen-Chuan Lian, Guangdong (CN); Feng Zhou, Guangdong (CN)

(73) Assignees: Hong Fu Jin Precision Industry (Shen Zhen) Co., Ltd., Longhua Town, Bao'an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 656 days.

(21) Appl. No.: 11/619,614

(22) Filed: Jan. 4, 2007

(65) Prior Publication Data

US 2007/0250727 A1 Oct. 25, 2007

(30) Foreign Application Priority Data

Apr. 19, 2006 (CN) .................. 2006 1 0060401

(51) Int. Cl.  
*G06F 1/32* (2006.01)
(52) U.S. Cl. .................. 713/324; 713/300; 713/310
(58) Field of Classification Search ................ 713/300, 713/310, 322, 323, 324  
See application file for complete search history.

(56) References Cited

U.S. PATENT DOCUMENTS

| 5,637,982 | A | * | 6/1997 | Nanno et al. ................. 320/150 |
| 5,715,278 | A | | 2/1998 | Croft et al. |
| 5,752,046 | A | * | 5/1998 | Oprescu et al. ............. 713/300 |
| 6,301,674 | B1 | * | 10/2001 | Saito et al. .................. 713/340 |
| 7,020,786 | B2 | * | 3/2006 | Vyssotski et al. ........... 713/300 |
| 2003/0226047 | A1 | | 12/2003 | Park |
| 2005/0091550 | A1 | * | 4/2005 | Tani ........................... 713/320 |

FOREIGN PATENT DOCUMENTS

CN 1622672 A 6/2005

* cited by examiner

*Primary Examiner*—Dennis M Butler  
(74) *Attorney, Agent, or Firm*—Winston Hsu

(57) ABSTRACT

A method for implementing a power saving function of the portable electronic apparatus is provided. The method includes the step of: receiving an electricity quantity value transmitted from the charge meter unit; determining which particular electric charge range the electricity quantity value falls in; searching the particular electric charge range in a power management table stored in a data storage; obtaining a new work mode which corresponds to the particular electric charge range when the current work mode does not correspond to the particular electric charge range; determining the work state changes of the components from the current work mode to the new work mode; signaling the power control unit to change the work states of the components which work state need changed when the apparatus is changed from the current work mode to the new work mode.

6 Claims, 3 Drawing Sheets

PORTABLE ELECTRONIC APPARATUS WITH A POWER SAVING FUNCTION AND METHOD FOR IMPLEMENTING THE POWER SAVING FUNCTION

BACKGROUND OF THE INVENTION

1. Field of the Invention

The present invention relates generally to a portable electronic apparatus with a power saving function and a method for implementing the power saving function.

2. Description of Related Art

With the development of electronic technology, various battery-powered portable electronic apparatuses such as handsets, PDAs (Personal digital assistants), MP3 players, and e-books, has brought convenience to people. Batteries used in the portable electronic apparatus may quickly run out of energy, and thus need to be charged or replaced frequently to replenish power. Otherwise, the portable electronic apparatuses will have no power to function.

Many solutions are brought out to reduce the power consumption of the portable electronic apparatuses, thus to prolong service times per charge of the batteries of the portable electronic apparatuses. Those solutions generally set a "standby state" or a "sleep state" for a portable electronic apparatus. In the "standby state" or the "sleep state" the power supply to the portable electronic apparatus is reduced, thus reducing power consumption of the portable electronic apparatus.

However, in actual applications, even in the "standby state" or the "sleep state", most components of the portable electronic apparatus are in an enabled state and consume power, which results in current operation or necessary operations cannot be implemented when only a little power is left.

Therefore, What is still needed is a portable electronic apparatus and method which can further save power.

SUMMARY OF THE INVENTION

A portable electronic apparatus with a power saving function is provided. A preferred embodiment of the apparatus includes a power unit, a data storage, an charge meter unit, a power control unit, and a CPU. The power unit is for supplying power directly to the CPU, the charge meter unit, and the power control unit. The data storage is for storing a power management table that lists relationships between electric charge ranges and work modes of the apparatus. The charge meter unit is for detecting electric charge of the power unit in real-time and obtains an electronic quantity value. The power control unit is for controlling power supply of power consuming components except the CPU, the charge meter unit, and the power control unit. The power unit is for supplying power directly to the CPU, the charge meter unit, and the power control unit. The CPU (central processing unit) includes an electric charge value input module, a work mode determining module, a work mode determining module, a component state determining module, and a component state update module. The electric charge value input module is for receiving the electricity quantity value transmitted from the charge meter unit. The electric charge range determining module is for determining a particular electric charge range the electricity quantity value falls in. The work mode determining module is for obtaining a new work mode that corresponds to the particular electric charge range in the power management table when the current work mode does not correspond to the particular electric charge range. The component state determining module is for determining the work state changes of the components from the current work mode to the new work mode. The component state update module for signaling the power control unit to change the work states of the components.

A method for implementing a power saving function of the portable electronic apparatus is provided. The method includes the step of: receiving an electricity quantity value transmitted from the charge meter unit; determining which particular electric charge range the electricity quantity value falls in; searching the particular electric charge range in a power management table stored in a data storage; obtaining a new work mode which corresponds to the particular electric charge range when the current work mode does not correspond to the particular electric charge range; determining the work state changes of the components from the current work mode to the new work mode; signaling the power control unit to change the work states of the components which working state need changed when the apparatus is changed from the current work mode to the new work mode.

Other advantages and novel features will be drawn from the following detailed description of the preferred embodiment with reference to the attached drawings, in which:

DETAILED DESCRIPTION OF THE INVENTION

Figure 1:
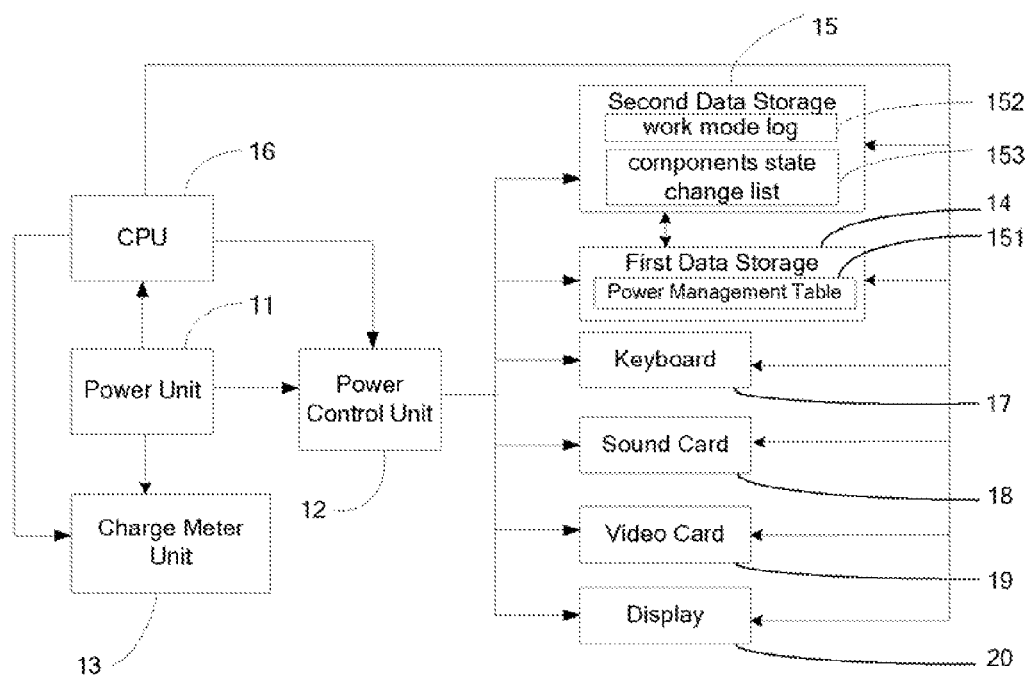
FIG. 1 is an exemplary hardware infrastructure diagram of a portable electronic apparatus with a power saving function in accordance with a preferred embodiment of the present invention.

FIG. 1 is an exemplary hardware infrastructure diagram of a portable electronic apparatus with a power saving function (hereinafter "the apparatus") in accordance with a preferred embodiment of the present invention. The apparatus includes a power unit 11, a power control unit 12, a charge meter unit 13, a first data storage 14, a second data storage 15, a CPU (central processing unit) 16, and other components such as a keyboard 17, a display 18, a sound card 19, and a video card 20.

The power unit 11 is for supplying power to power consuming components of the apparatus. In the preferred embodiment, the power unit 11 supplies power directly to the power control unit 12, the CPU 16, the charge meter unit 13 and the power control unit 12. The CPU 16 and the charge meter unit 13 are in an enabled state unless the apparatus is powered off. The power unit 111 supplies power to the first data storages 14 and second data storage 15 and other components of the apparatus via the power control unit 12. The power control unit 12 controls the power supply of the first data storages 14, second data storages 15 and other components of the apparatus according to control instructions transmitted from the CPU 16. The charge meter unit 13 is for detecting an electric charge of the power unit 12 in real-time and transmitting an electric charge value to the CPU 16.

The first data storage 14 is a nonvolatile data storage for storing a power management table 151 which lists a series of electric charge ranges and work modes for the apparatus. When current electric charge of the power unit 12 falls in a particular electric charge range listed in the power management table 151, the apparatus is set in a particular work mode that corresponds to the particular electric charge range.

In the particular work mode, a work state of components of the apparatus, including the first data storage 14, the second data storage 15, and the other components of the apparatus that are necessary is kept/changed in an enabled state and the work state of the components that are not necessary is changed/put to a disabled state. That is, each of the particular work modes defines necessary components required according to the particular electric charge range. For example, in a first particular electric charge range, a read work mode is set for the apparatus. In the read work mode, the first data storage 14, the second data storages 15, and the display 20 are set to the enabled state, while the other components are set to the disabled state. The power management table 151 lists relationships between the electric charge ranges and the work modes of the apparatus.

The second data storage 15 is a volatile storage such as a memory, for storing data read from the first data storage 11 temporarily. When the apparatus is powered on, the power management table 151 is read from the first data storage 14 into the second data storage 15. The second data storage 15 further stores a work mode log 152 and a components state change list 153. After initiated, the apparatus enters a particular work mode that is listed in the power management table 151 according to the particular electric charge range that a current electric charge of the power unit 12 falls in. The work mode log 152 is generated in the second data storage 15 and is for storing a current work mode of the apparatus. In the example, the particular work mode is the current work mode and thus recorded in the work mode log 152.

As a service time of the portable electronic apparatus continues, the electric charge of the power unit 12 decreases. When the electric charge of the 12 falls in a second particular electric charge range, the apparatus enters a second particular work mode, the second particular work mode becomes the current work mode and is recorded in the work mode log 152. The components state change list 153 is generated in the second data storage 15 at a first instance of a work mode change after the apparatus is powered on. The components state change list is for recording the work state changes of components of the work mode changes of the apparatus.

Figure 2:
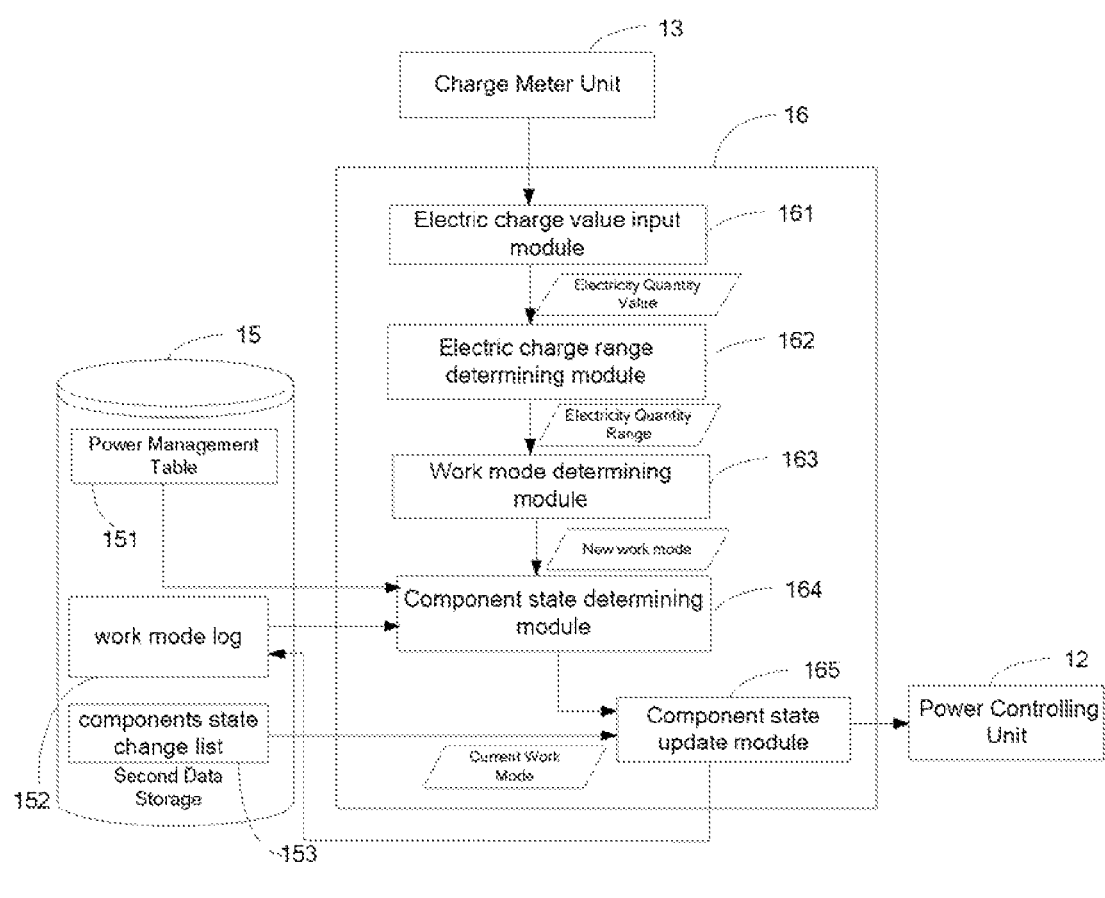
FIG. 2 is a function module diagram of a CPU of FIG. 1.

FIG. 2 is a function module diagram of the CPU 16. The CPU 16 includes an electric charge value input module 161, a work mode determining module 162, an electric charage range determining module 163, a component state determining module 164, and a component state update module 165.

The electric charge value input module 161 is for receiving the electric charge value transmitted from the charge meter unit 13. The electric charage range determining module 162 is for determining the particular electric charge range the electricity quantity value falls in. The work mode determining module 163 is for searching for the particular electric charge range in the power management table 151 and detect whether the current work mode recorded in the work mode log 152 corresponds to the work mode listed according to the electric charge range. The work mode determining module 163 is further for obtaining a new work mode from the power management table 151 according to the electric charge range if the current work mode recorded in the work mode log 152 does not correspond to work mode listed in the power management table 151 according to the electric charge range. The working state determining module 164 is for determining the work state changes of the components required from the current work mode to the new work mode, and updating the components state change list 153 thus, recording the work state changes.

The component state update module 165 is for signaling the power control unit 13 to change the work states of the components according to the work state changes recorded in the components state change list 153. For example, if a work state change of the first data storage 14 recorded in the components state change list 153 is "on-to-off", the component state update module 165 signals the power control unit 13 to cut off the power supply of the first data storage 14, thus makes the first data storage 11 enter the disabled state. The work states changes according to the components state change list 153 are finished by the component state update module 165 and accordingly the apparatus enters into the new work mode, the new work mode is now the current work mode and recorded in the work mode log 152.

Figure 3:
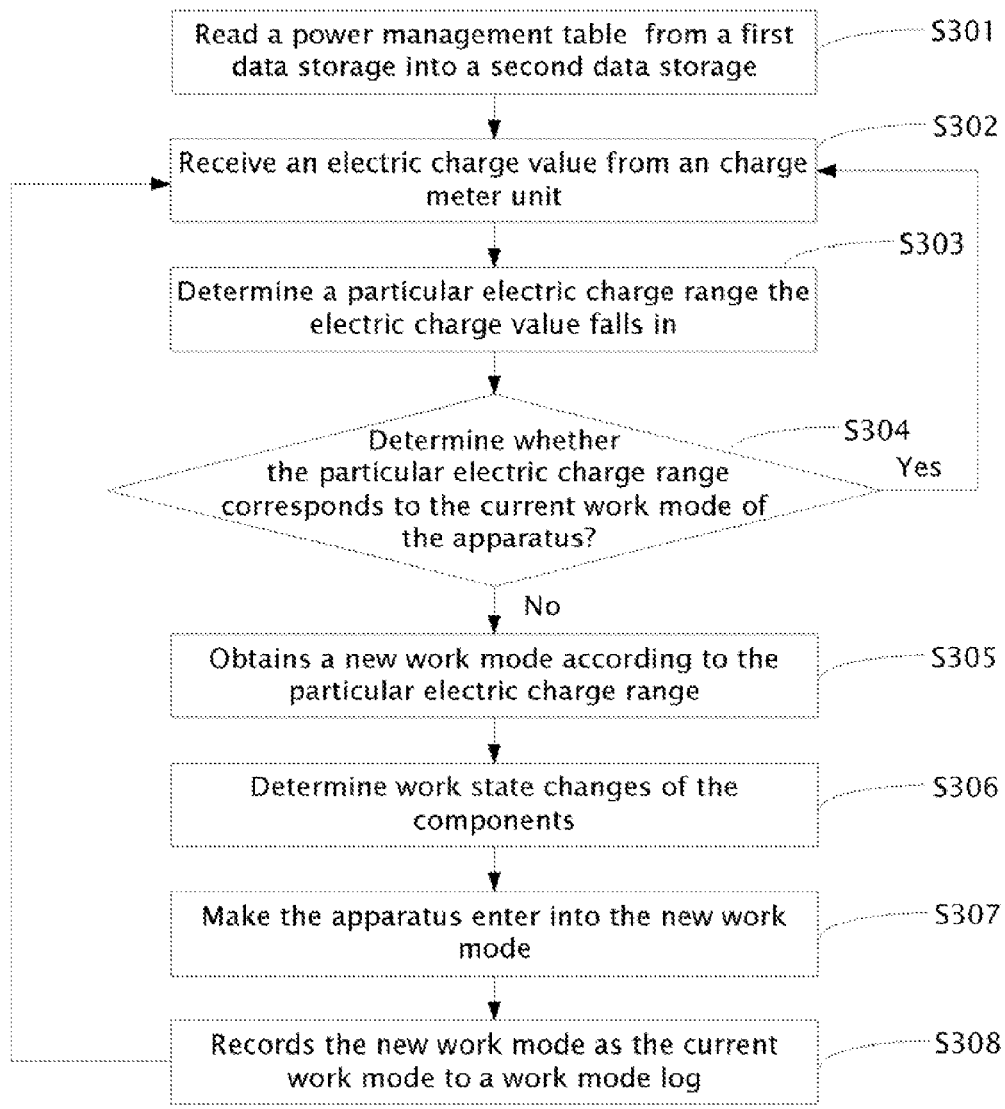
FIG. 3 is a flow chart for implementing a power saving function of the portable electronic apparatus of FIG. 1.

FIG. 3 is a flow chart for implementing the power saving function of the portable electronic apparatus of FIG. 1.

In step S301, the power management table 151 is read from the first data storage 14 into the second data storage 15 after the apparatus is powered on.

In step S302, the electric charge value input module 161 receives the electric charge value of the power unit 11 transmitted from the charge meter unit 13.

In step S303, the electric charge range determining module 162 determines the particular electric charge range listed in the power management table 151 the electric charge value falls in.

In step S304, the work mode determining module 163 determines whether the particular electric charge range corresponds to the current work mode recorded in the work mode log 152. The procedure returns to step S302 described above if the particular electric charge range corresponds to the current work mode and goes on to step S305 described below otherwise.

In step S305, the work mode determining module 163 searches the particular electric charge range in the power management table 151 and retrieves a new work mode according to the particular electric charge range.

In step S306, the component state determining module 164 determines work state changes of the components from the current work mode to the new work mode, and updates the components state change list 153 to record the work state changes.

In step S307, the component state update module 165 signals the power control unit 13 to change the work states of the components according to the components state change list 153, thus the apparatus enters into the new work state.

In step S308, the component state update module 165 updates the work mode log to record the new work mode as the current work mode. The procedure then returns to step S302 and repeats until the apparatus is powered off.

Although the present invention has been specifically described on the basis of a preferred embodiment, the invention is not to be construed as being limited thereto. Various changes or modifications may be made to the embodiment without departing from the scope and spirit of the invention.

What is claimed is:

1. A portable electronic apparatus with a power saving function, comprising:
   a data storage for storing a power management table that lists relationships between electric charge ranges and work modes of the apparatus;
   a CPU (central processing unit);
   a power unit;
   a charge meter unit for detecting electric charge of the power unit in real-time and obtaining an electronic quantity value; and
   a power control unit for controlling power supply of power consuming components except the CPU, the charge meter unit, and the power control unit;

wherein, the power unit is for supplying power directly to the CPU, the charge meter unit, and the power control unit;

the CPU comprises:

an electric charge value input module for receiving the electricity quantity value transmitted from the charge meter unit;

an electric charge range determining module for determining a particular electric charge range the electricity quantity value falls in;

a work mode determining module for obtaining a new work mode that corresponds to the particular electric charge range in the power management table when the current work mode does not correspond to the particular electric charge range;

a component state determining module for determining the work state changes of the components from the current work mode to the new work mode; and a component state update module for signaling the power control unit to change the work states of the components.

2. The apparatus as described in claim 1, wherein the data storage further storing a work mode log for recording the current work mode of the apparatus.

3. The apparatus as described in claim 1, wherein the data storage further storing a components state change list for recording work state changes of the components from the current work mode to the new work mode.

4. A method for implementing a power saving function of the portable electronic apparatus, comprising:

providing a CPU (central processing unit);
providing a power unit;
providing a charge meter unit for detecting electric charge of the power unit in real-time and obtaining an electronic quantity value;
providing a power control unit for controlling power supply of power consuming components except the CPU, the charge meter unit, and the power control unit;
wherein, the power unit is for supplying power directly to the CPU, the charge meter unit, and the power control unit;
receiving an electricity quantity value transmitted from the charge meter unit;
determining which particular electric charge range the electricity quantity value falls in;
searching the particular electric charge range in a provided power management table;
retrieving a new work mode according to the particular electric charge range;
determining work state changes of the components from the current work mode to the new work mode;
signaling the power control unit to change the work states of the components according to the determined work state changes of the components.

5. The method as described in claim 4, further comprises the step of recording the work state changes in a component statue updating table after the work state changes of the components from the current work mode to the new work mode is determined.

6. The method as described in claim 4, further comprises the step of recording the new work mode as a current work mode in a work mode log.

* * * * *